United States Patent [19]
Ladin

[11] 3,871,093
[45] Mar. 18, 1975

[54] PROCESS FOR MAKING SPLIT-RING BALL BEARINGS

[75] Inventor: Eli M. Ladin, Ann Arbor, Mich.

[73] Assignee: Federal-Mogul Corporation, Southfield, Mich.

[22] Filed: Feb. 20, 1974

[21] Appl. No.: 444,120

[52] U.S. Cl..... 29/148.4 A, 29/DIG. 1, 29/DIG. 26, 29/413, 29/427
[51] Int. Cl..... B23p 11/00, B23p 17/00, B21h 1/12
[58] Field of Search. 29/148.4 A, 148.4 R, 149.5 R, 29/413, DIG. 1, DIG. 26, 427

[56] References Cited
UNITED STATES PATENTS
3,546,762  12/1970  Martin ..................... 29/148.4 A Primary Examiner—Thomas H. Eager
Attorney, Agent, or Firm—Harness, Dickey & Pierce

[57] ABSTRACT

A process for fabricating split-ring bearing assemblies of the type including a pair of ring members, at least one of which is of a sectionalized construction, and which are formed with raceways within which a plurality of antifriction elements are constrained. The sectionalized ring member is formed from a plurality of ring sections which are adhesively secured into a bonded assembly which is finish machined as a unit, whereafter the bonded assembly is cleaved to provide a matched set of ring sections for use in the final assembly of the bearing.

10 Claims, 5 Drawing Figures

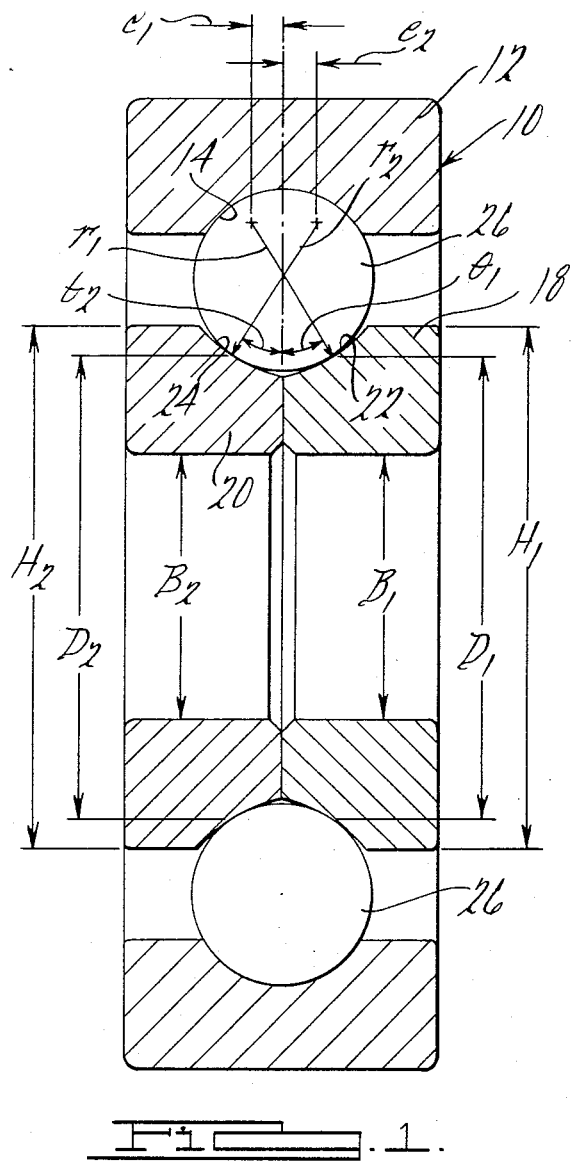
FIG. 1.
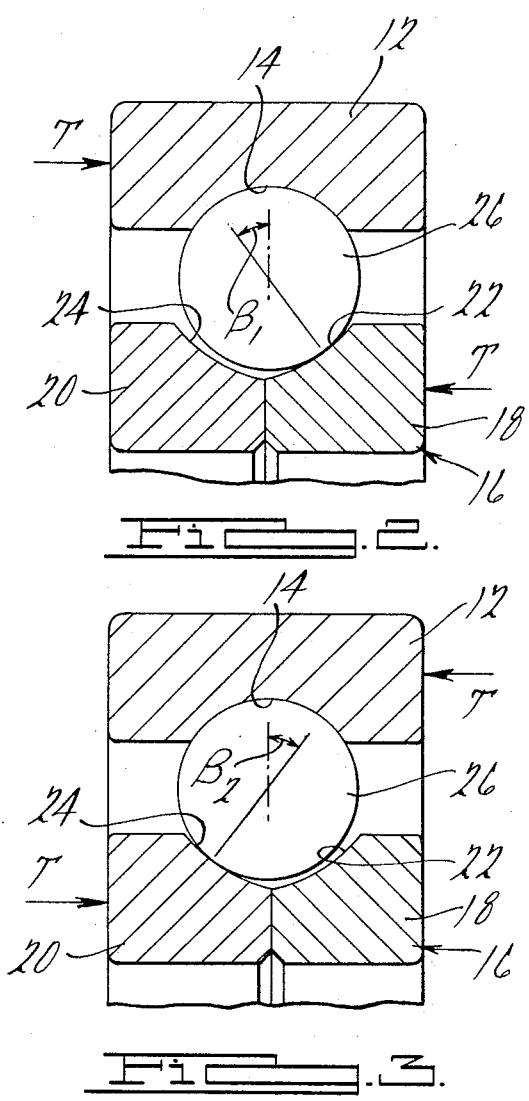
FIG. 2.
FIG. 3.
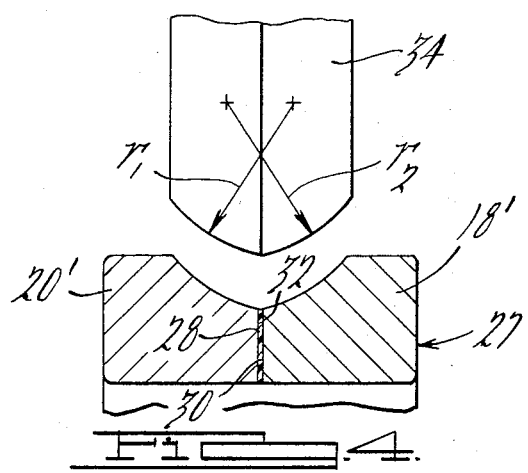
FIG. 4.
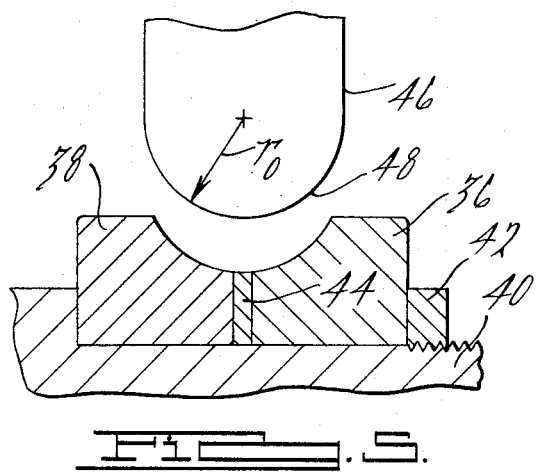
FIG. 5.

PROCESS FOR MAKING SPLIT-RING BALL BEARINGS

BACKGROUND OF THE INVENTION

The present invention is particularly applicable but not necessarily limited to the manufacture of precision split-ring ball bearing assemblies of the angular contact type incorporating either a single or plural rows of balls and which are particularly adapted for carrying thrust loads, as well as radial loading. Typically, bearings of the foregoing type are suitable for use in turbine engines, torque converters, machine tool spindles, deep well pumps and various high load and/or high speed applications requiring precision performance under conditions in which a combination of radial and thrust loads are encountered. The bearing is also applicable for use in nonprecision applications, such as in conveyors, for example, in which greater latitude in the dimensional tolerances of such bearings can be tolerated. In either event, it is conventional in bearings of the foregoing type to split either the inner or outer race or ring member to enable an assembly of the maximum number of balls or antifriction elements, thereby optimizing the load carrying properties and durability of the bearing.

It has been conventional in accordance with prior art practices for manufacturing split-ring bearing assemblies to manually inspect the machined ring sections comprising each split race member in an effort to achieve a substantially identical set of mated ring sections. In spite of the use of modern precision machining techniques, it is ordinarily impossible to effect a mating of identical ring sections, which necessitates a further final finishing such as by grinding of the preliminarily mated ring set. Conventionally, the ring sets are mounted on suitable fixtures and are clamped thereon using a spacer, such as a precision shim, between the abutting faces of the ring sections. The preliminarily matched set thereafter is processed together through all of the final finishing operations including race grinding, land grinding, bore honing, radial clearance measurements, outer ring mating, washing and final packaging. During such processing, the ring sections are held together by various special fixtures, metal straps and wires, in order to permit the necessary finishing operations to be performed and which usually require a removal and remounting or retying on passing from one operation to the next operation. The foregoing tedious, time consuming and costly manufacturing operation is necessary since the individual ring sections comprising the split or sectionalized ring member must be as symmetrical and as identical to one another as possible in order to provide for optimum load carrying capacity, performance and durability.

In spite of the painstaking inspection and measurements made of individual ring sections in an attempt to form matched sets and thereafter the concurrent processing of such sets while positioned on elaborate fixtures, the resultant sectionalized race members produced still are not exactly identical due to the geometric variations that inherently exist in randomly and separately manufactured components, which in turn prevents the attainment of optimum functional properties of the final bearing assembly. The present invention overcomes the problems and disadvantages associated with prior art manufacturing processes of split-ring type bearing assemblies, providing not only a precision mating of individual ring sections, but also providing for a substantial simplification and reduction in costs heretofore associated with such manufacturing operations.

SUMMARY OF THE INVENTION

The benefits and advantages of the present invention are achieved by a process for fabricating split-ring type bearing assemblies which conventionally comprise a pair of ring members of which at least one is of a split or sectionalized construction and which ring members are formed with raceways within which a plurality of antifriction elements are constrained. The individual ring sections are separately manufactured to within tolerances approaching those of the final assembly and whereafter a random selection and mating of the individual ring sections is effected and the resultant set is adhesively secured together into a bonded ring assembly. The resultant bonded ring assembly is processed as in the case of integral ring or raceway members to effect a final accurate finishing and grinding of the bores, lands and raceways, thereby automatically producing a perfectly matched set of ring sections. Thereafter, the adhesive bond is cleaved, enabling a separation of the individual ring sections preparatory to their assembly with the other integral raceway member and antifriction elements into a bearing assembly.

Additional benefits and advantages of the present invention will become apparent upon a reading of the description of the preferred embodiments taken in conjunction with the accompanying drawing.

BRIEF DESCRIPTION OF THE DRAWING

FIG. 1 is a transverse vertical sectional view of a typical angular contact ball bearing having a split inner ring member adapted for manufacture in accordance with the practice of the present invention;

FIG. 2 is a fragmentary sectional view of the ball bearing shown in FIG. 1 having imposed thereon a thrust load in one direction;

FIG. 3 is a fragmentary sectional view similar to FIG. 2 showing the ball bearing having a thrust load imposed thereon in a direction opposite to that shown in FIG. 2;

FIG. 4 is a fragmentary elevational view partly in section of a split inner ring assembly bonded by an adhesive preparatory to a finish grinding of the raceway; and FIG. 5 is a fragmentary elevational view, partly in section, illustrating the grinding of a split inner ring in accordance with prior art practices.

DESCRIPTION OF THE PREFERRED EMBODIMENTS

Referring now in detail to the drawing, and as may be best seen in FIGS. 1–3, an angle contact ball bearing assembly indicated at 10 is illustrated incorporating a split inner ring member which is typical of those suitable for manufacture in accordance with the process of the present invention. As shown, the ball bearing assembly comprises an outer ring or raceway member 12 incorporating an annular raceway 14 and an inner split-ring or raceway member 16 comprised of a pair of mated ring sections 18 and 20. The ring section 18 defines an arcuate raceway 22, while the ring section 20 defines a corresponding raceway 24 which in combination with the raceway 14 of the outer ring member serve to retain a plurality of antifriction elements such as balls 26 in circumferentially spaced relationship therealong.

In order to achieve optimum load carrying capacity, performance and durability of such split-ring bearings, it is important that certain dimensional relationships between the two ring sections 18, 20 be as identical as possible. In the exemplary split-ring member 16 illustrated in FIG. 1, the ring sections are symmetrical such that the following important dimensions should be substantially identical: bore $B_1 = B_2$; land diameter $H_1 = H_2$; race diameter $D_1 = D_2$; race radius $r_1 = r_2$; rest angle $\theta_1 = \theta_2$ and axial offset of the center of raceway curvature with respect to the center line of the raceway $e_1 = e_2$.

By maintaining an accurate mating of the two ring sections, the imposition of thrust loading on the bearing in either direction as illustrated in FIGS. 2 and 3 by the arrows causes a slight axial offset of the inner and outer race members such that the actual angle of contact of the balls 26 are equal ($\beta_1 = \beta_2$). In the specific embodiment illustrated, the raceway of the inner ring member as defined by races 22 and 24 of the ring sections is of a gothic arch configuration, while the raceway 14 of the outer ring member is of a uniform radius concentric with that of the periphery of the balls 26. It will be appreciated that the magnitude of offset ($e_1$, $e_2$) can vary to provide any desired negative race radius offset, as well as any desired positive value and can also be different for each ring section in order to optimize the performance of the bearing consistent with its intended end use. It will be further understood that the process as subsequently to be described is also applicable to bearings in which the outer ring member is split or of a sectionalized construction in addition to bearings including double or plural rows of antifriction elements, as well as a plurality of individual split-ring bearings mounted in tandem relationship to provide the necessary load carrying capacity.

In accordance with the present process, the individual ring sections are preliminarily machined in accordance with conventional machining practices to dimensional tolerances within several thousandths of an inch and are thereafter selected at random and mated into preliminary sets. The ring sets are thereafter adhesively secured into a bonded assembly 27 by means of an adhesive layer, indicated at 28 in FIG. 4, applied between the abutting faces 30, 32 of preliminarily machined ring sections 18', 20'. It is usually preferred to remove any cutting oils, lubricants or other residual contaminating substances from the abutting faces 30, 32 to assure the attainment of a uniform and high strength adhesive bond. The adhesive layer 28 is applied in the form of a thin film having a thickness usually ranging from about 0.0001 to about 0.0003 inch and is allowed to set and/or cure for the required time period in accordance with the characteristics of the specific adhesive material employed.

Once the adhesive has set, the bonded assembly 27 is processed in the same manner as an integral ring member, such as the outer member 12, to effect a honing of the bore, a grinding of the lands, a grinding of the side faces and a final grinding of the raceways employing a grinding wheel indicated at 34 in FIG. 4. The cutting periphery of the grinding wheel is of a gothic arch configuration as defined by radii $r_1$, $r_2$ providing the desired curvature and offset. The processing of the bonded assembly 27 through the several final finishing operations, including intervening inspections and measurements, is performed without the need of mounting the bonded assembly on special fixtures or tying or strapping the ring sections together as is required in accordance with prior art practices. At the conclusion of the final finishing and measuring operations, the bonded assembly 27 is matched with an outer ring member 12 and the necessary number of balls or antifriction elements and the resulting matched components are thereafter retained as a matched group through the remaining assembly and packaging operation. The bonded assembly 27 can readily be cleaved into the individual ring sections by imposing a shear load on the adhesive bond line, causing a rupture thereof and, whereafter, if desired, the abutting faces 30, 32 can be further cleaned, such as by solvent, to remove any residual adhesive remaining thereon.

FIG. 5 is provided as a basis of comparing prior art practices with the present process in which carefully measured and selected ring sections 36, 38 are securely mounted on a fixture including a spindle 40 and clamping nut 42. A shim 44 of an accurate thickness is placed between the ring sections preliminary to the race grinding operation. As shown in FIG. 5, a grinding wheel 46 having a peripheral cutting face 48 of a constant radius $r_o$ is employed. Upon the completion of the race grinding operation, the shim 44 is removed so that upon movement of the two ring sections toward each other until their abutting faces contact, a similar gothic arch raceway configuration is provided as in the case of the grinding operation illustrated in FIG. 4. It will be appreciated from the arrangement illustrated in FIG. 5 that a demounting and remounting of the individual ring sections is repeatedly necessitated in order to enable successive grinding or honing of the bore and side faces of the inner ring member, which constitutes a tedious, time consuming and costly operation.

In the formation of a bonded assembly in accordance with the practice of the present invention, any suitable adhesive composition can be employed which serves to tenaciously bond the several ring sections together into a substantially rigid assembly and wherein the bond formed is of a strength sufficient to withstand the forces normally imposed on the bonded component during the several finishing operations, as well as during handling between operations. The adhesive also is characterized as one which will not deteriorate upon coming in contact with the various cutting fluids and lubricants employed in the final finishing operations and one which at the conclusion of the process can readily be fractured such as by cleaving or applying a shear load to effect a bond rupture. Particularly satisfactory results are achieved employing adhesive compositions consisting of polymerizable compounds having anaerobic curing characteristics which may conveniently be defined as the property of a polymerizable compound to polymerize rapidly and spontaneously to a solid or cured state upon the exclusion of air or oxygen. It will be appreciated that such anaerobic curing properties are particularly desirable in the bonding or adhesive joining of the individual ring sections into a bonded assembly since the adhesive composition can be permitted to stand in contact with air for extended periods of time without polymerizing. However, when applied in the form of a thin film between the abutting surfaces causing an exclusion of air, the adhesive composition rapidly polymerizes and forms a strong bond.

Typical of various classes of resins and catalyst groups which can be satisfactorily employed in the adhesive systems are: an uncured polyester resin and a peroxide catalyst to promote room temperature curing with or without conventional accelerators; an unsaturated maleic alkyd resin dissolved in a copolymerizing monomer such as styrene and a peroxide catalyst; an uncured epoxy resin and a dibasic acid catalyst such as phthalic acid or an amine catalyst such as ethylenediamine; an uncured alkyd resin and a diisocyanate catalyst such as toluene diisocyanate; phenolic one-stage resins and a strong acid such as toluene sulfonic acid; and high boiling monomers such as diallyl phthalate or diallyl maleate with a peroxide catalyst; or the like. Further details of such anaerobic adhesive curing compositions are disclosed in U.S. Pat. Nos. 2,901,099; 3,041,322; 3,043,820; 3,046,262 and 3,218,303, the substance of which are incorporated herein by reference. Alternative satisfactory adhesive compositions which are heat-activatable and/or curable of the various types commercially available and which are of the requisite strength and compatibility, can also be satisfactorily employed for use in the present process.

The manner by which the adhesive is applied to the joining surfaces of the ring sections is not important as long as a relatively thin and uniform bond line is achieved. The preliminarily secured assembly can be clamped under pressure in aligned relationship for a period of time as may be dictated by the type of adhesives employed to assure proper setting of the adhesive joints, whereafter the bonded assembly can be handled free from any further restraints or attachments throughout the remaining processing cycle.

While it will be apparent that the invention herein described is well calculated to achieve the benefits and advantages set forth above, it will be appreciated that the invention is susceptible to modification, variation and change without departing from the spirit thereof.

What is claimed is:

1. In a process for fabricating a split-ring bearing assembly of the type comprising a pair of ring members at least one of which is of a sectionalized construction and which are formed with raceways within which a plurality of antifriction elements are retained, the steps of forming a plurality of ring sections having a shape and size such that the assembly thereof substantially defines said sectionalized ring member, adhesively securing said ring sections together into a bonded ring assembly, finish machining the surfaces of said bonded ring assembly to the desired final dimensions and surface finish, and thereafter cleaving said bonded ring assembly and separating the mated final machined said ring sections preparatory to assembly thereof with the other ring member and antifriction elements into a bearing.

2. The process as defined in claim 1, including the further step of precleaning the surfaces of said ring sections before the application of adhesive thereto.

3. The process as defined in claim 1, in which the step of forming the ring sections is performed to produce a pair of said ring sections having mating surfaces disposed in a plane substantially perpendicular to the axis of said sectionalized ring member and passing through substantially the center of the raceway formed therearound.

4. The process as defined in claim 1, in which the step of forming the ring sections is performed to produce a pair of said ring sections of substantially identical shape and size, each upon assembly defining one half of the sectionalized ring member.

5. The process as defined in claim 1, in which the step of finish machining said bonded ring assembly includes grinding the raceway to impart a cross sectional configuration having the form of a symmetrical gothic arch.

6. The process as defined in claim 1, including the further steps of transferring said bonded ring assembly between the several finish machining steps as an integral individual unsupported component.

7. The process as defined in claim 1, further characterized in that the step of adhesively securing said ring sections together is performed in a manner which minimizes the thickness of the adhesive layer.

8. The process as defined in claim 1, including the further step of removing any residual adhesive from the surfaces of the final machined said ring sections after cleaving said bonded ring assembly.

9. The process as defined in claim 1, in which the step of cleaving said bonded ring assembly is achieved by applying a force on the assembly to effect a shear rupture of the adhesive bond.

10. The process as defined in claim 1, further characterized in the step of adhesively securing said ring sections together utilizing an anaerobic type adhesive.

* * * * *